United States Patent
Kim et al.

(10) Patent No.: US 6,844,908 B2
(45) Date of Patent: Jan. 18, 2005

(54) APPARATUS FOR INJECTING LIQUID CRYSTAL MATERIALS AND METHODS FOR MANUFACTURING LIQUID CRYSTAL PANELS BY USING THE SAME

(75) Inventors: Hee-Sub Kim, Suwon (KR); Kwan-Sun Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 87 days.

(21) Appl. No.: 09/967,938

(22) Filed: Oct. 2, 2001

(65) Prior Publication Data
US 2002/0039168 A1 Apr. 4, 2002

(30) Foreign Application Priority Data
Oct. 4, 2000 (KR) ......................................... 2000-58290

(51) Int. Cl.[7] ......................... G02F 1/13; G02F 1/1341; G02F 1/1339
(52) U.S. Cl. ......................... 349/187; 349/189; 349/190
(58) Field of Search ................................. 349/187, 189, 349/190

(56) References Cited

U.S. PATENT DOCUMENTS

| | | | | |
|---|---|---|---|---|
| 4,412,724 A | * | 11/1983 | Sandhu ....................... | 349/124 |
| 4,753,276 A | | 6/1988 | Inaba et al. .................... | 141/7 |
| 5,583,671 A | * | 12/1996 | Yoshida et al. ............... | 349/93 |
| 5,835,181 A | * | 11/1998 | Nakamura et al. .......... | 349/189 |
| 2002/0135730 A1 | * | 9/2002 | Ono et al. .................. | 349/187 |

FOREIGN PATENT DOCUMENTS

| | | | | |
|---|---|---|---|---|
| CN | 1127364 | | 7/1996 | ........... G02F/1/133 |
| EP | 0458321 A2 | | 11/1999 | ......... G02F/1/1341 |
| JP | 57-089722 A | * | 6/1982 | |
| JP | 60-97321 | * | 5/1985 | |
| JP | 04-366914 A | * | 12/1992 | |
| KR | 9305564 | | 6/1993 | ......... G02F/1/1341 |
| KR | 19930005564 B1 | | 6/1993 | ........... G02F/1/134 |

* cited by examiner

Primary Examiner—Tarifur R. Chowdhury
(74) Attorney, Agent, or Firm—McGuireWoods LLP

(57) ABSTRACT

First, a completed liquid crystal cell made by adhering two substrates with a sealant is loaded into a liquid crystal injection chamber, and then the liquid crystal injection chamber forms a high vacuum by evacuating much of the air from the chamber. The injection hole of the sealant is completely immersed in the liquid crystal material. At this time, the interior of the liquid crystal cell enclosed by the sealant is under high vacuum. Next, non-active gas is injected into the interior of the liquid crystal injection chamber, and then the vacuum in the interior of the chamber is reduced or it is allowed to return to atmospheric pressure. Then, because the interior of the liquid crystal injection chamber is at low vacuum or at atmospheric pressure and the interior of the liquid crystal cell enclosed by the sealant is at high vacuum, the liquid crystal material is injected into the interior of the liquid crystal cell enclosed by the sealant. If ultrasonic waves are applied to the liquid crystal material through the ultrasonic wave generator, cavities are formed in the liquid crystal material. As a result of the asymmetric collapse of the cavity bubbles, additional pressure is generated, hence the speed of the liquid crystal injection is increased.

2 Claims, 2 Drawing Sheets

APPARATUS FOR INJECTING LIQUID CRYSTAL MATERIALS AND METHODS FOR MANUFACTURING LIQUID CRYSTAL PANELS BY USING THE SAME

BACKGROUND OF THE INVENTION (a) Field of the Invention

The present invention relates to an apparatus for injecting liquid crystal materials and methods for manufacturing liquid crystal panels by using the same.

(b) Description of the Related Art

In general, a liquid crystal display (LCD) has two substrates having electrodes and a liquid crystal layer between the two substrates. The substrates are adhered to each other by a sealant deposited at the edges of the substrates, and are supported by spacers dispersed between the substrates. Different electrical potentials are applied to the electrodes while forming electric fields for varying the orientation of the liquid crystal molecules. In this way, the light transmission is controlled to thereby display picture images.

To manufacture this LCD, an alignment layer to align the liquid crystal molecules is formed and rubbed. Then, spacers are dispersed on the inner surface of one of the two substrates, and the sealant having an injection hole is deposited on the inner surface of one of the substrates near the edge of the substrate. Next, the two substrates are adhered to each other through a hot press process, and a liquid crystal material is injected into the cell gap between the two substrates through the injection hole to form a liquid crystal layer. Finally, a liquid crystal cell is completed by filling the injection hole with a sealant.

Here, the process of injecting the liquid crystal material will be described in detail.

First, a tray containing the liquid crystal material and liquid crystal panel is loaded into an airtight filling chamber, and a high vacuum is developed inside of the chamber. Next, the injection hole of the liquid crystal panel is completely immersed in the liquid crystal material, and then the inside of the filling chamber is gradually returned to atmospheric pressure. In that case, the liquid crystal material is injected into the cell gap between the two substrates through the injection hole.

However, in a conventional method for manufacturing the conventional LCD, the process of injecting the liquid crystal material takes a long time, because the liquid crystal material is injected through a narrow injection hole under vacuum. Generally, the injecting process of a 17 inch liquid crystal panel takes about 12 hours, and it is difficult to mass-produce a smectic liquid crystal panel having a narrower cell gap by using this injecting process. Furthermore, as the cell gap is reduced to less than 2 $\mu$m, the injecting process time in this manufacturing method suddenly increases.

SUMMARY OF THE INVENTION

An object of the present invention is to provide an apparatus for manufacturing a liquid crystal panel to minimize an injecting process time and a method for manufacturing the liquid crystal panels by using the same.

In the method for manufacturing a liquid crystal panel according to this invention, ultrasonic waves are irradiated while injecting the liquid crystal material into the cell gap.

An apparatus for manufacturing a liquid crystal panel according to the present invention comprises a tray containing liquid crystal material for injecting, and an ultrasonic wave generator attached to the outside surface opposite to the inner surface of the tray and generating ultrasonic waves to form cavities in the liquid crystal material when injecting the liquid crystal material.

At this time, it is desirable that the ultrasonic wave generator be attached to the lower surface of the tray opposite the liquid crystal material.

Furthermore, in the manufacturing of a liquid crystal panel according to this invention, the inside of a liquid crystal cell having two substrates and the sealant deposited on the inner surface near the edge of the liquid crystal cell and having an injection hole is under high vacuum. Next, the injection hole of the liquid crystal panel is completely immersed in the liquid crystal material, and then the liquid crystal material is injected into the cell gap between the two substrates through the injection hole while irradiating ultrasonic waves to the liquid crystal materials.

BRIEF DESCRIPTION OF THE DRAWINGS

The preferred embodiment of the present invention will now be described more specifically with reference to the attached drawings, wherein.

DETAILED DESCRIPTION OF THE PREFERRED EMBODIMENTS

Preferred embodiments of the present invention are described below with reference to the accompanying drawings.

FIGS. 1A, 1B, 1C and 1D are process order drawings illustrating a method for manufacturing a liquid crystal panel by using an apparatus for injecting liquid crystal material according to an embodiment of the present invention.

First, as shown in FIGS. 1A to 1D, an apparatus for manufacturing a liquid crystal panel according to the present invention comprises a tray 20, which contains liquid crystal material 10, for injecting liquid crystal materials, and an ultrasonic wave generator 30 attached to the outside surface of the tray 20 and generating ultrasonic waves to form cavities in the liquid crystal material 10. At this time, it is desirable that the ultrasonic wave generator 30 be attached to the lower surface of the tray 20 opposite the liquid crystal material.

Next, a liquid crystal injection process among a method for manufacturing a liquid crystal panel using the apparatus for injecting liquid crystal material according to an embodiment of the present invention will be described.

Figure 1A:
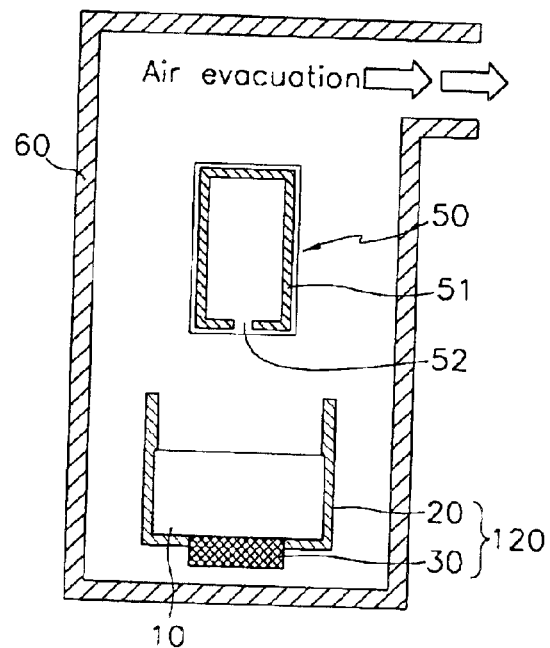
FIGS. 1A, 1B, 1C and 1D are process order drawings illustrating a method for manufacturing a liquid crystal panel according to an embodiment of the present invention.

First, as shown in FIG. 1A, in the method for manufacturing a liquid crystal display according to the present invention, a liquid crystal cell 50 is manufactured through an alignment treatment process to align liquid crystal materials, a spacer distribution process to maintain the interval between two substrates of the liquid crystal cell 50, a sealant deposit process depositing a sealant 51 having an injection hole 52 on one of the two substrates, and a hot press process adhering the two substrates to each other by the sealant 51. Next, the liquid crystal cell 50 is loaded into a liquid crystal injection chamber 60, and then much of the air in the liquid crystal injection chamber 60 is evacuated. At this time, the liquid crystal injection chamber 60 has a liquid crystal injection apparatus 120 comprising a tray 20 containing liquid crystal material, and an ultrasonic wave generator 30 generating ultrasonic waves to form cavities in the liquid crystal material 10.

Figure 1B:
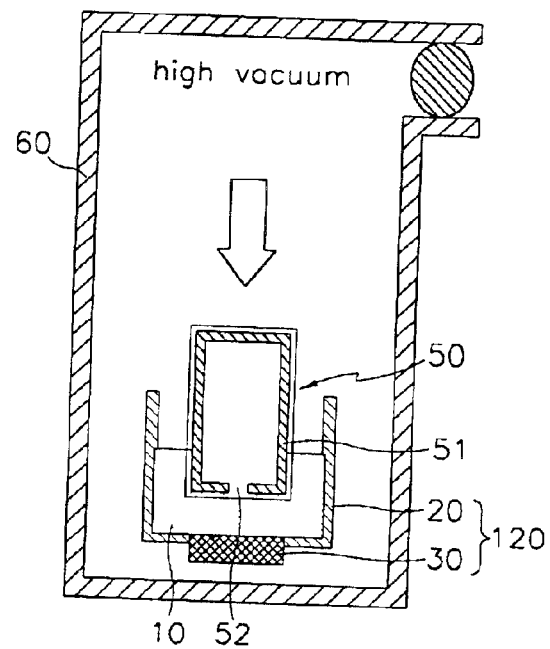

Next, as shown in FIG. 1B, the interior of the liquid crystal injection chamber 60 forms a high vacuum by evacuating much of the air in the liquid crystal injection chamber 60, and then the liquid crystal cell 50 sinks in the tray 20. At this time, the injection hole 52 of the sealant 51 is completely immersed in the liquid crystal material 10, and the interior of the liquid crystal cell 50 enclosed by the sealant 51 is under high vacuum.

Figure 1C:
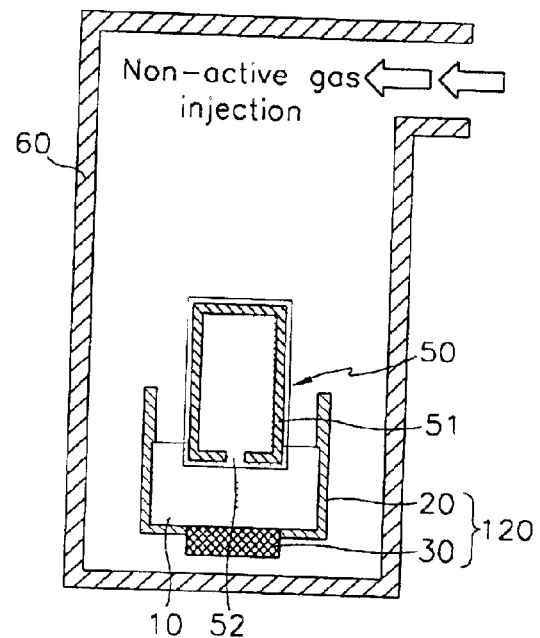

Next, as shown in FIG. 1C, non-active gas is injected into the interior of the liquid crystal injection chamber 60, and then the vacuum in the interior of the liquid crystal injection chamber 60 is reduced or is allowed to return to atmospheric pressure. Then, because the interior of the liquid crystal injection chamber 60 is at low vacuum or at atmospheric pressure and the interior of the liquid crystal cell 50 enclosed by the sealant 51 is at high vacuum, the liquid crystal material 10 is injected into the interior of the liquid crystal cell 50 enclosed by the sealant 51.

At this time, ultrasonic waves are applied to the liquid crystal material 10 by the ultrasonic wave generator 30, and cavities are formed in the liquid crystal material 10. As a result of the asymmetric collapses of the cavity bubbles, additional pressure is generated, hence speeding up the liquid crystal injection.

Figure 1D:
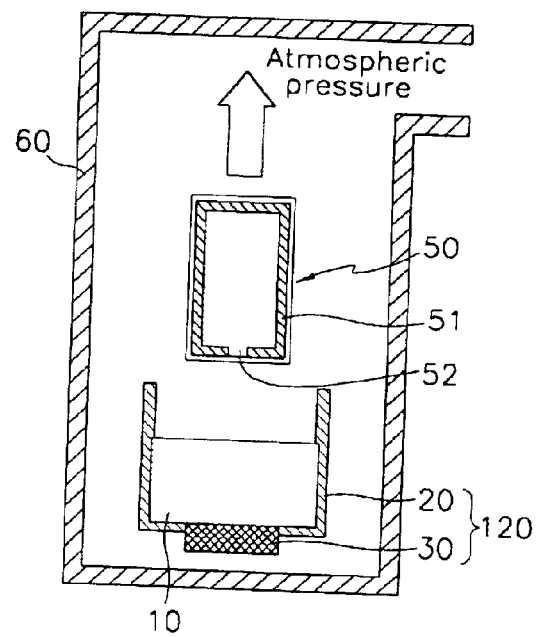

Next, as shown in FIG. 1D, the liquid crystal injection process is completed by removing the liquid crystal cell 50 from the tray 20 containing the liquid crystal material 10.

The injection hole 52 is sealed later, and a detailed description of this process is omitted.

In the manufacturing method of an LCD according to the invention, the time of liquid crystal injection is minimized by using ultrasonic waves. In the case of a 17 inch liquid crystal panel, the time of liquid crystal injection is in the range of 15–18 minutes. The invention may not only be applied to the method for manufacturing a twisted nematic type liquid crystal panel, an in-plane switching type forming an electric field substantially parallel to the panel, or a vertical align type, all of which have a comparably large cell gap, but it may also be applied to the method for manufacturing a smectic type liquid crystal panel having a narrow cell gap.

The apparatus for injecting liquid crystal material according to the present invention may be used to inject other liquid materials into airtight spaces. Particularly, when liquid injection takes a long time due to a small airtight space, use of an ultrasonic wave generator may minimize the time for liquid material injection.

Accordingly, the time of the liquid crystal injection may be minimized by using the ultrasonic wave generator.

What is claimed is:

1. A method for manufacturing a liquid crystal display panel, comprising steps of:

combining two substrates with a sealant to form a liquid crystal cell having an injection hole;

immersing the injection hole of the liquid crystal cell in liquid crystal in a vacuum; and injecting the liquid crystal into the liquid crystal cell through the injection hole while forming cavity bubbles in the liquid crystal using an ultrasonic wave generator.

2. The method of claim 1, wherein the step of injecting the liquid crystal comprises a step of injecting a non-active gas into the vacuum chamber.

* * * * *